United States Patent
DeCesare et al.

(10) Patent No.: US 9,787,070 B2
(45) Date of Patent: Oct. 10, 2017

(54) RAINTIGHT COMPRESSION CONNECTOR AND RAINTIGHT COMPRESSION COUPLER FOR SECURING ELECTRICAL METALLIC TUBING OR RIGID METALLIC CONDUIT

(71) Applicant: Bridgeport Fittings, Inc., Stratford, CT (US)

(72) Inventors: Christopher W. DeCesare, Naugatuck, CT (US); Lawrence J. Smith, Stamford, CT (US)

(73) Assignee: BRIDGEPORT FITTINGS, INC., Stratford, CT (US)

(*) Notice: Subject to any disclaimer, the term of this patent is extended or adjusted under 35 U.S.C. 154(b) by 0 days.

(21) Appl. No.: 15/079,148

(22) Filed: Mar. 24, 2016

(65) Prior Publication Data

US 2016/0204587 A1    Jul. 14, 2016

Related U.S. Application Data

(63) Continuation-in-part of application No. 14/068,663, filed on Oct. 31, 2013, now Pat. No. 9,343,883.

(60) Provisional application No. 62/142,150, filed on Apr. 2, 2015.

(51) Int. Cl.
  *H02G 3/06* (2006.01)
  *F16J 15/02* (2006.01)
  *F16J 15/10* (2006.01)

(52) U.S. Cl.
  CPC .......... *H02G 3/0616* (2013.01); *F16J 15/028* (2013.01); *F16J 15/10* (2013.01)

(58) Field of Classification Search
  CPC .... H02G 3/0616; H02G 3/065; H02G 3/0658; F16L 19/06

USPC ................. 285/354, 248, 342, 343
See application file for complete search history.

(56) References Cited

U.S. PATENT DOCUMENTS

| | | |
|---|---|---|
| 1,186,812 A | 6/1916 | McFerran |
| 1,327,106 A | 1/1920 | Leahy |
| 1,488,175 A | 3/1924 | Strandell |
| 1,772,536 A | 8/1930 | Cox |
| 1,796,806 A | 3/1931 | Pearson |
| 1,809,582 A | 6/1931 | Church |
| 1,809,583 A | 6/1931 | Church |
| 1,888,343 A | 11/1932 | Bohlman et al. |
| 2,139,413 A | 10/1933 | Kreidel |
| 2,100,796 A | 11/1937 | Church |
| 2,158,757 A | 5/1939 | Max |
| 2,233,214 A | 2/1941 | Neil |

(Continued)

FOREIGN PATENT DOCUMENTS

CN    102011904 A    4/2011

*Primary Examiner* — David E Bochna
(74) *Attorney, Agent, or Firm* — Ware, Fressola, Maguire & Barber LLP

(57) ABSTRACT

A raintight compression connector has a connector body with first and second portions and a bore extending therethrough for connection to a conduit. An upper sealing ring is dimensioned to contact the connector body to make sealing contact with a conduit. The upper sealing ring has first, second and third regions. The first region has a first sloping surface to contact a recess shoulder in the connector body and the third region has a third sloping surface to contact an inner surface of the connector body. Specific slopes for these sloping surfaces are disclosed. The upper sealing ring can also be used in a raintight compression coupler.

18 Claims, 15 Drawing Sheets

(56) References Cited

U.S. PATENT DOCUMENTS

| | | | |
|---|---|---|---|
| 2,255,673 A | 9/1941 | McDermott | |
| 2,448,888 A | 9/1948 | Hynes | |
| 2,473,119 A * | 6/1949 | Wolfram | F16L 19/10 285/342 |
| 2,474,319 A | 6/1949 | Jacques | |
| 2,503,169 A | 4/1950 | Phillips | |
| 2,651,529 A | 7/1951 | Wayman | |
| 2,761,705 A | 9/1956 | Kreidel | |
| 2,833,569 A | 5/1958 | Budnick | |
| 2,862,732 A * | 12/1958 | Guillou | F16L 19/10 285/342 |
| 2,836,438 A | 5/1959 | Turnipseed | |
| 2,912,262 A * | 11/1959 | Franck | F16L 19/08 285/348 |
| 2,913,264 A * | 11/1959 | Suendermann | F16L 19/061 285/342 |
| 3,275,347 A | 9/1966 | William | |
| 3,393,931 A | 7/1968 | Wurzburger | |
| 3,647,934 A | 3/1972 | Hurtt | |
| 3,667,783 A | 6/1972 | Sotolongo | |
| 3,794,362 A | 2/1974 | Mooney | |
| 3,801,131 A | 4/1974 | Appleton | |
| 3,907,335 A | 9/1975 | Burge et al. | |
| 3,972,547 A | 8/1976 | Itoya | |
| 4,019,762 A | 4/1977 | Eidelberg et al. | |
| 4,030,741 A | 6/1977 | Fidrych | |
| 4,145,075 A | 3/1979 | Holzmann | |
| 4,250,348 A | 2/1981 | Kitagawa | |
| 4,376,873 A | 3/1983 | Lackinger | |
| 4,508,466 A | 4/1985 | Dennis | |
| 4,515,991 A | 5/1985 | Hutchison | |
| 4,547,623 A | 10/1985 | Van Brunt et al. | |
| 4,549,755 A | 10/1985 | Kot et al. | |
| 4,606,562 A | 8/1986 | Saraceno | |
| 4,608,454 A | 8/1986 | Lackinger | |
| 4,676,533 A | 6/1987 | Gerondale | |
| 4,877,270 A | 10/1989 | Phillips | |
| 4,915,427 A | 4/1990 | Zahuranec | |
| 4,983,784 A | 1/1991 | Whitlock | |
| 5,028,078 A | 7/1991 | Schwarz et al. | |
| 5,037,140 A | 8/1991 | Anderson | |
| 5,068,494 A | 11/1991 | Bolante | |
| 5,208,427 A | 5/1993 | Couto et al. | |
| 5,230,536 A | 7/1993 | Rider et al. | |
| 5,393,109 A | 2/1995 | Gumpel | |
| 5,466,890 A | 11/1995 | Stagnitti | |
| 5,621,191 A | 4/1997 | Norris et al. | |
| 5,951,327 A | 9/1999 | Marik | |
| 6,073,976 A | 6/2000 | Schmidt et al. | |
| 6,268,565 B1 | 7/2001 | Daoud | |
| 6,641,180 B2 | 11/2003 | Udhoefer | |
| 6,702,336 B1 | 3/2004 | Chelchowski et al. | |
| 6,835,088 B2 | 12/2004 | Shemtov | |
| 6,840,550 B2 | 1/2005 | Sundholm | |
| 6,851,728 B2 | 2/2005 | Minami | |
| 6,988,746 B2 | 1/2006 | Olson | |
| 7,002,077 B2 | 2/2006 | Pyron | |
| 7,080,859 B1 | 7/2006 | Gretz et al. | |
| 7,390,027 B2 | 6/2008 | Kiely | |
| 7,438,327 B2 | 10/2008 | Auray | |
| 7,614,668 B1 * | 11/2009 | Williams | F16L 19/10 285/342 |
| 7,841,630 B1 | 11/2010 | Auray | |
| 7,976,070 B2 | 7/2011 | Kiely | |
| 8,129,633 B1 | 3/2012 | Shemtov | |
| 8,474,877 B2 | 7/2013 | Smith | |
| 8,931,810 B2 * | 1/2015 | Clason | F16L 19/103 285/342 |
| 2004/0090067 A1 | 5/2004 | Pridham | |
| 2005/0194785 A1 | 9/2005 | Shemtov | |
| 2008/0143103 A1 | 6/2008 | Kiely | |

* cited by examiner

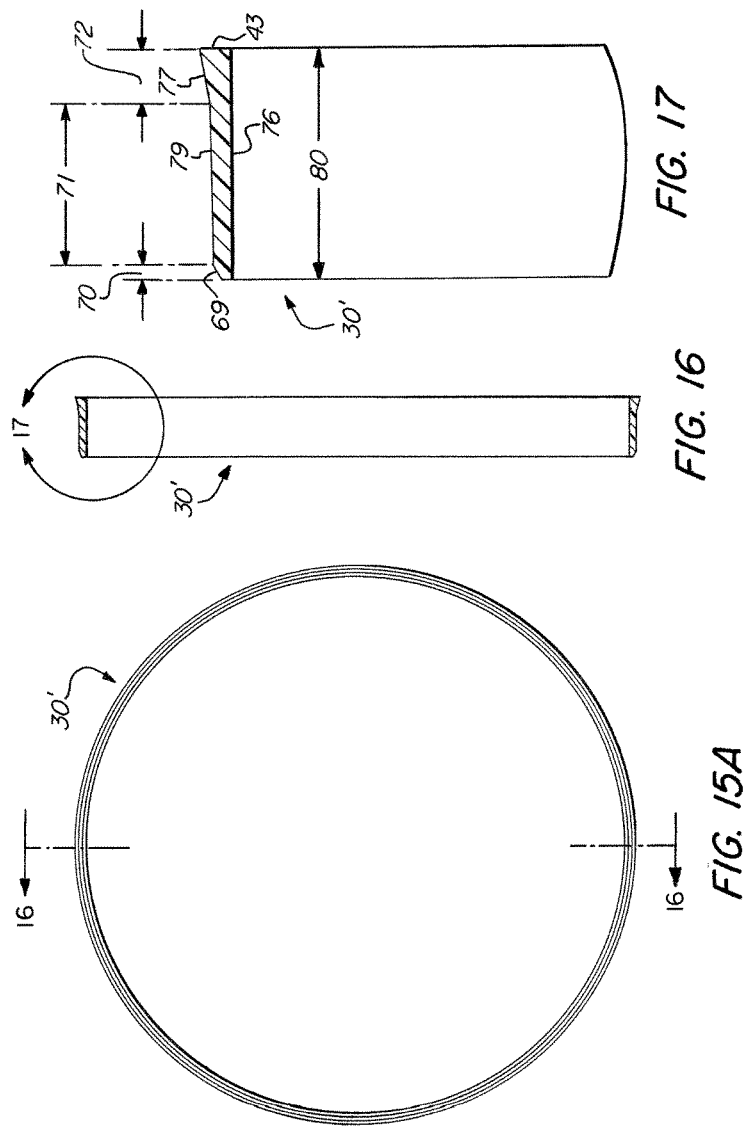

US 9,787,070 B2

RAINTIGHT COMPRESSION CONNECTOR AND RAINTIGHT COMPRESSION COUPLER FOR SECURING ELECTRICAL METALLIC TUBING OR RIGID METALLIC CONDUIT

CROSS REFERENCE TO RELATED APPLICATIONS

This application claims priority under 35 USC §119 to U.S. Provisional Patent Application No. 62/142,150 filed on Apr. 2, 2015, whose entire contents are hereby incorporated by reference.

This application also claims priority to U.S. Utility patent application Ser. No. 14/068,663filed on Oct. 31, 2013, now U.S. Pat. No. 9,343,883, whose contents are also hereby incorporated by reference.

FIELD OF THE INVENTION

This invention is directed to an improved raintight compression connector for securing electrical metallic tubing (EMT), or rigid metallic conduit (RMC), to an electrical enclosure and to a raintight compression coupler for securing two EMT's or RMC's to each other. The connector and coupler are sometimes collectively referred to herein as an electrical fitting or fitting. The improvement is specifically with respect to the upper sealing ring associated with the fitting.

BACKGROUND OF THE INVENTION

Various types of raintight electrical connectors have been developed for securing electrical metallic tubing to an electrical enclosure, such as a junction box or the like. Corresponding raintight electrical couplers have also been developed for securing two EMT's or RMC's to each other. Existing connectors and couplers may use a sealing ring for preventing water intrusion between the outer surface of the EMT or RMC and an electrical enclosure or other EMT or RMC. It has been observed that existing connectors and couplers may have difficulty maintaining a raintight connection, due to sealing surface imperfections of the EMT or RMC outside diameters, especially with larger diameter trade sizes.

SUMMARY OF THE INVENTION

A raintight compression connector or coupler according to an embodiment of the present invention incorporates an upper sealing ring with an improved design and a stop seal secured against a shoulder (conduit stop) of the fitting, which in combination effectively accommodate outside diameter or surface imperfection tolerance variations in the EMT or RMC (collectively referred to as conduit), surface imperfections in the EMT or RMC, as well as a skewed terminating face of the EMT or RMC (not at right angles to the longitudinal axis of the EMC or RMC) and thereby provides an improved raintight compression connector or coupler.

An embodiment of the present invention is a raintight compression connector comprising a connector body having a first portion and a second portion and a bore extending through the first portion and the second portion, the first portion dimensioned for receipt of a conduit in said bore, the first portion having a first end and a second end, a gland nut having internal threads dimensioned for threaded engagement with first external threads formed in the first portion at the first end, a gland ring dimensioned for contact with the gland nut so as to secure the gland nut and the first portion of the connector body to the conduit when the conduit is inserted into the first portion, an upper sealing ring dimensioned for contact with the first portion of the connector body so as to make sealing contact with the conduit when the conduit is inserted into the first portion, said upper sealing ring having first, second and third regions, the second region formed between the first and third regions, the first region having a first sloping surface dimensioned to contact a recess shoulder in the bore of the first portion of the connector body and the third region having a third sloping surface dimensioned to contact an inner surface of the first portion of the connector body, and a stop seal positioned in the bore of first portion against a shoulder formed in the first portion at the second end thereof, the stop seal dimensioned to contact a terminating face of the conduit so as to pliably deform around the conduit terminating face so as to form a watertight seal between said conduit terminating face and the shoulder, wherein the connector body has an outer flange and wherein the second portion of the connector body is dimensioned for receipt of a knockout gasket, the second portion having second external threads dimensioned for receipt of a locknut for securing the knockout gasket positioned around a knockout hole in an electrical enclosure between said outer flange and the electrical enclosure, thereby forming a raintight seal therewith.

Another embodiment of the present invention is the raintight compression connector as described above, wherein the slope of said third sloping surface is approximately ten degrees relative to a lower surface of the upper sealing ring.

Another embodiment of the present invention is the raintight compression connector as described above, wherein the slope of said first sloping surface is approximately thirty degrees relative to a lower surface of the upper sealing ring.

A further embodiment of the present invention is the raintight compression connector as described above, wherein the second region has a second sloping surface and wherein the slope of the second sloping surface is approximately two degrees relative to a lower surface of the upper sealing ring.

A still further embodiment of the present invention is the raintight compression connector as described above, wherein the upper sealing ring has an overall length and the third region of said upper sealing ring is approximately twenty-three percent of said overall length.

Another embodiment of the present invention is the raintight compression connector as described above, wherein the first region of said upper sealing ring is approximately six and one-half percent of said overall length of the upper sealing ring.

Another embodiment of the present invention is the raintight compression connector as described above, wherein the upper sealing ring has an uncompressed cross-sectional profile substantially as shown in FIG. 17.

A further embodiment of the present invention is the raintight compression connector as described above, wherein the upper sealing ring is manufactured from a thermoplastic material.

A further embodiment of the present invention is the raintight compression connector as described above, wherein the thermoplastic material is selected from the group consisting of polyethylene and polypropylene.

Another embodiment of the present invention is a raintight compression coupler comprising a connector body having a first portion and a second portion and a bore extending through the first portion and the second portion, the first portion dimensioned for receipt of a first conduit in said bore, the first portion having a first end and a second end and the second portion dimensioned for receipt of a second conduit in said bore, the second portion having a first end and a second end, a first gland nut having internal threads dimensioned for threaded engagement with first external threads formed in the first portion at its first end, a first gland ring dimensioned for contact with the first gland nut so as to secure the first gland nut and the first portion of the connector body to the first conduit when the first conduit is inserted into the first portion, a first upper sealing ring dimensioned for contact with the first portion of the connector body so as to make sealing contact with the first conduit when the first conduit is inserted into the first portion, said first upper sealing ring having a first, second and third region, the second region formed between the first and third regions, the first region having a sloping surface dimensioned to contact a recess shoulder in the bore of the first portion of the connector body and the third region having a sloping surface dimensioned to contact an inner surface of the first portion of the connector body, and a first stop seal positioned in the bore of the first portion against a shoulder formed at the second end of the first portion, the first stop seal dimensioned to contact a terminating face of the first conduit so as to pliably deform around the first conduit terminating face so as to form a watertight seal between said first conduit terminating face and the first shoulder, a second gland nut having internal threads dimensioned for threaded engagement with second external threads formed in the second portion at its first end, a second gland ring dimensioned for contact with the second gland nut so as to secure the second gland nut and the second portion of the connector body to the second conduit when the second conduit is inserted into the second portion, a second upper sealing ring dimensioned for contact with the second portion of the connector body so as to make sealing contact with the second conduit when the second conduit is inserted into the second portion, said second upper sealing ring having a first, second and third region, the second region formed between the first and third regions, the first region having a sloping surface dimensioned to contact a recess shoulder in the bore of the first portion of the connector body and the third region having a sloping surface dimensioned to contact an inner surface of the second portion of the connector body, and a second stop seal positioned in the bore of the second portion against a shoulder formed at the second end of the second portion, the second stop seal dimensioned to contact a terminating face of the second conduit so as to pliably deform around the second conduit terminating face so as to form a watertight seal between said second conduit terminating face and the shoulder.

Another embodiment of the present invention is the raintight compression coupler as described above, wherein the slopes of said third sloping surface of the first upper sealing ring and the third sloping surface of the second upper sealing ring are approximately ten degrees relative to a lower surface of the first upper sealing ring and a lower surface of the second upper sealing ring respectively.

A further embodiment of the present invention is the raintight compression coupler as described above, wherein the slopes of the first sloping surface of the first upper sealing ring and the first sloping surface of the second upper sealing ring are approximately thirty degrees relative to a lower surface of the first upper sealing ring and a lower surface of the second upper sealing ring respectively.

A further embodiment of the present invention is the raintight compression coupler as described above, wherein the second region of the first upper sealing ring and the second region of the second upper sealing ring each has a second sloping surface and wherein the slopes of the second sloping surface of the first upper sealing ring and the second sloping surface of the second upper sealing ring are approximately two degrees relative to a lower surface of the first upper sealing ring and a lower surface of the second upper sealing ring respectively.

A still further embodiment of the present invention is the raintight compression coupler as described above, wherein the first upper sealing ring and the second upper sealing ring each has an overall length and the third region of said first and second upper sealing rings are each approximately twenty-three percent of said overall length.

Another embodiment of the present invention is the raintight compression coupler as described above, wherein the first region of said first upper sealing ring and said second upper sealing ring are each approximately six and one-half percent of said respective overall length of the first and second upper sealing rings.

Another embodiment of the present invention is the raintight compression coupler as described above, wherein the first upper sealing ring and the second upper sealing ring each has an uncompressed cross-sectional profile substantially as shown in FIG. 17.

A further embodiment of the present invention is the raintight compression coupler as described above, wherein the first and second upper sealing rings are manufactured from a thermoplastic material.

A still further embodiment of the present invention is the raintight compression coupler as described above, wherein the thermoplastic material is selected from the group consisting of polyethylene and polypropylene.

Another embodiment of the present invention is an upper sealing ring for use in an electrical fitting, including a raintight compression connector or a raintight compression coupler, the upper sealing ring having a first region, a second region and a third region, the second region formed between the first and third regions, the first region having a first sloping surface dimensioned to contact a recess shoulder in a bore of a first portion of a connector body of said electrical fitting and the third region having a third sloping surface dimensioned to contact an inner surface of the first portion of the connector body.

A further embodiment of the present invention is the upper sealing ring as described above, wherein the slope of said third sloping surface is approximately ten degrees relative to a lower surface of the upper sealing ring.

A still further embodiment of the present invention is the upper sealing ring as described above, wherein the slope of said first sloping surface is approximately thirty degrees relative to a lower surface of the upper sealing ring.

Another embodiment of the present invention is the upper sealing ring as described above, wherein the second region has a second sloping surface and wherein the slope of the second sloping surface is approximately two degrees relative to a lower surface of the upper sealing ring.

A further embodiment of the present invention is the upper sealing ring as described above, wherein the upper sealing ring has an overall length and the third region of said upper sealing ring is approximately twenty-three percent of said overall length.

A still further embodiment of the present invention is the upper sealing ring as described above, wherein the first region of said upper sealing ring is approximately six and one-half percent of said overall length of the upper sealing ring.

Another embodiment of the present invention is the upper sealing ring as described above, wherein the upper sealing ring has an uncompressed cross-sectional profile substantially as shown in FIG. 17.

A further embodiment of the present invention is the upper sealing ring as described above, wherein the upper sealing ring is manufactured from a thermoplastic material.

A still further embodiment of the present invention is the upper sealing ring as described above, wherein the thermoplastic materials is selected from the group consisting of polyethylene and polypropylene.

BRIEF DESCRIPTION OF THE DRAWINGS

FIG. 15A is a top plan view of the upper sealing ring shown in FIG. 15.

FIG. 16 is a cross-sectional view of the upper sealing ring taken along line 16-16 of FIG. 15A.

FIG. 17 is an enlarged cross-sectional view of the profile of the upper sealing ring taken along circle 17 of FIG. 16.

DETAILED DESCRIPTION

The present invention is an improved upper sealing ring 30' forming part of a raintight compression connector 20 or a raintight compression coupler 20' as discussed below.

Figure 1:
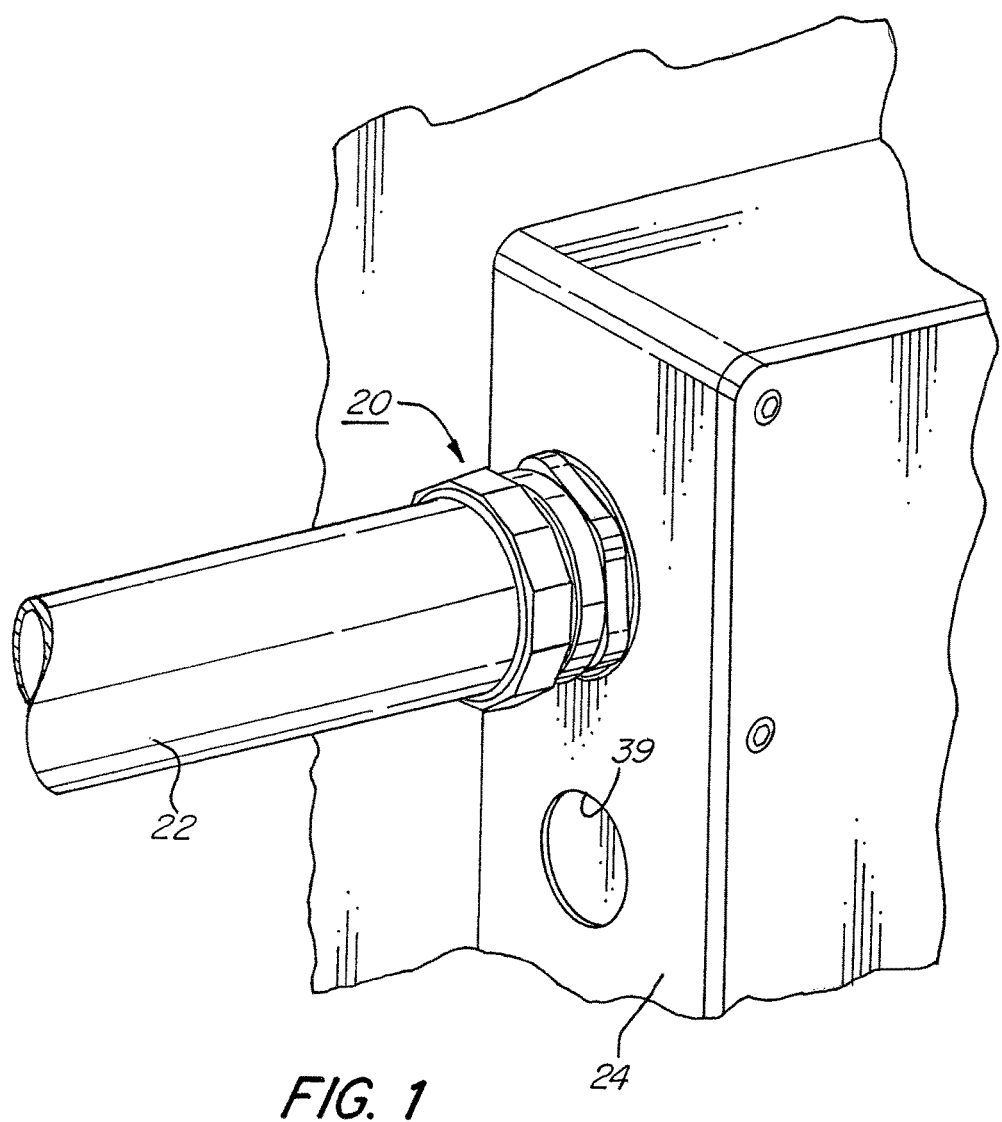
FIG. 1 is a perspective view of the raintight compression connector according to an embodiment of the present invention, the connector attached to an electrical enclosure.
Figure 2:
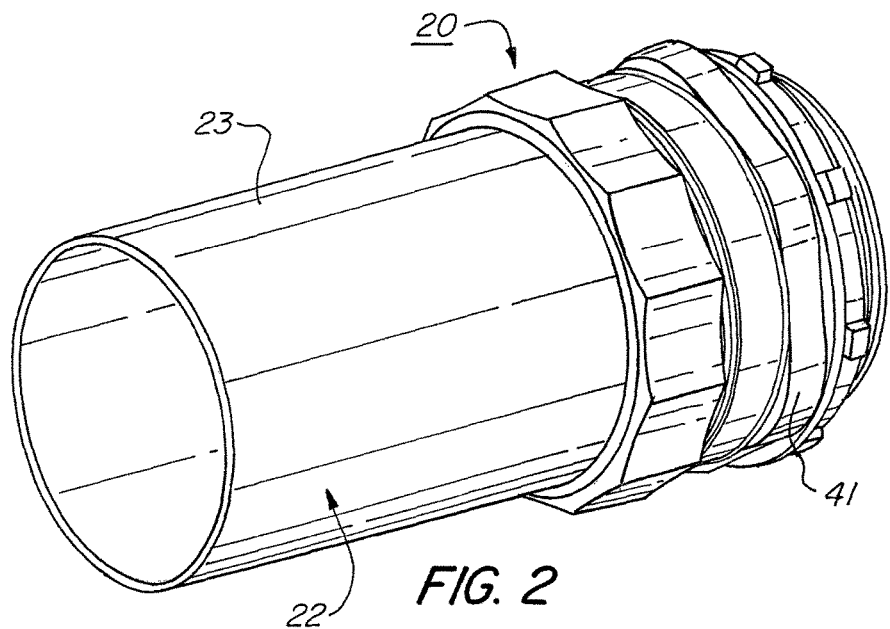
FIG. 2 is a perspective view of an electrical metallic tubing (EMT) or Rigid Metallic Conduit (RMC) inserted into the raintight compression connector shown in FIG. 1.

As seen in FIG. 1, an embodiment of a raintight compression connector 20 according to the present invention is configured for receipt of an electrical metallic tubing or rigid metallic conduit (EMT or RMC) 22 (collectively referred to as conduit) so as to form a raintight seal between the EMT or RMC and an electrical enclosure 24 to which the compression connector is attached through a knockout hole (see, for example, knockout hole 39). Such a raintight compression connector is typically used in applications where the electrical enclosure 24 is exposed to water, such as an outdoor environment where rain is present from time to time. It is known in the art that RMC is similar to EMC, but has a greater wall thickness and is therefore typically used in what are considered in the electrical contractor industry as heavy-duty applications.

FIGS. 1-6 show the components of the raintight compression connector. These components include a connector body 32 having a first portion 47 and a second portion 49 and a bore 33 extending through the first portion and the second portion. The raintight compression connector also includes a gland nut 26, a gland ring 28 (also referred to as a split compression ring), an upper sealing ring 30, as well as a knockout gasket 34, a locknut 36 and a conduit stop seal 38. The connector body, gland nut and locknut are typically fabricated from a die cast zinc alloy. Other materials and fabrication techniques could be used as known to those skilled in the art.

Figure 4:
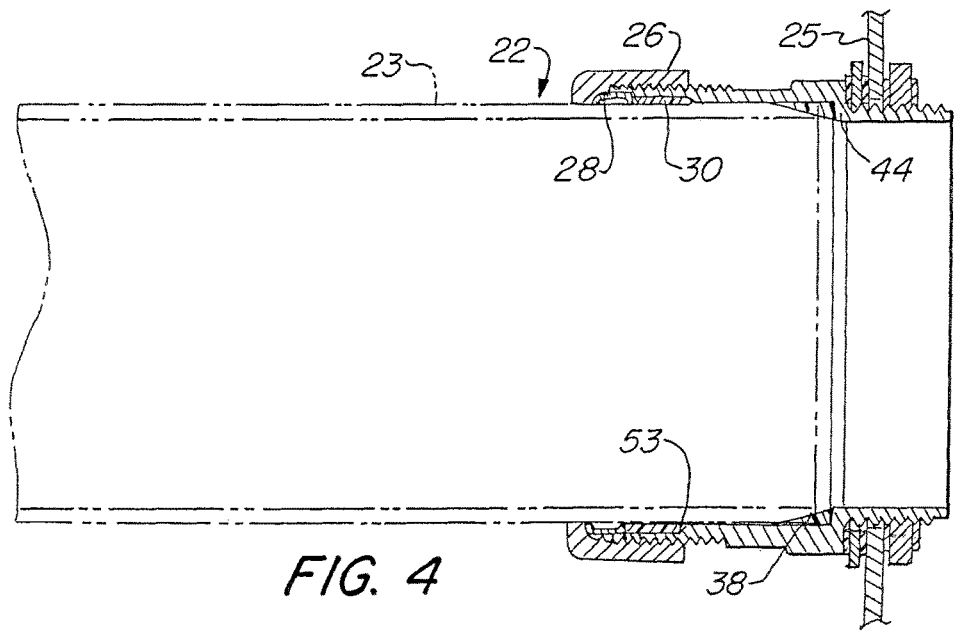
FIG. 4 is a cross-sectional view of the raintight compression connector taken along line 4-4 of FIG. 3.
Figure 5:
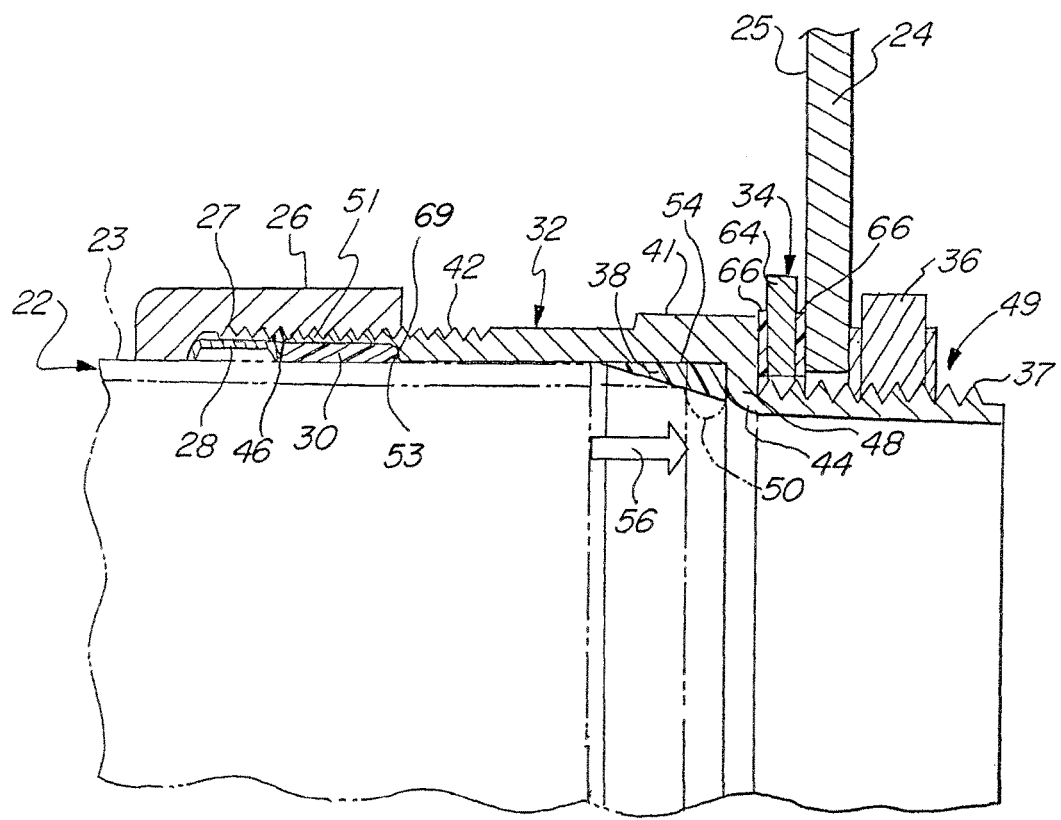
FIG. 5 is an enlarged cross-sectional view of the raintight compression connector shown in FIG. 4 illustrating how the EMT or RMC is advanced in the direction shown by an arrow so as to contact a secondary sealing seal.

The gland ring 28 and upper sealing ring 30 are dimensioned to be secured against an outer surface 23 of EMT or RMC 22 as best seen in FIGS. 4 and 5. The gland ring is typically manufactured from zinc plated spring steel while the upper sealing ring is typically manufactured from thermoplastic, such as polyethylene or polypropylene. The gland nut has threads 27 that interfit with threads 42 formed at a first end 46 of first end portion 47. The gland nut when threaded onto threads 42 compresses the gland ring 28 which in turn bites into outer surface 23 of conduit 22 and also presses against upper sealing ring 30.

Figure 6:
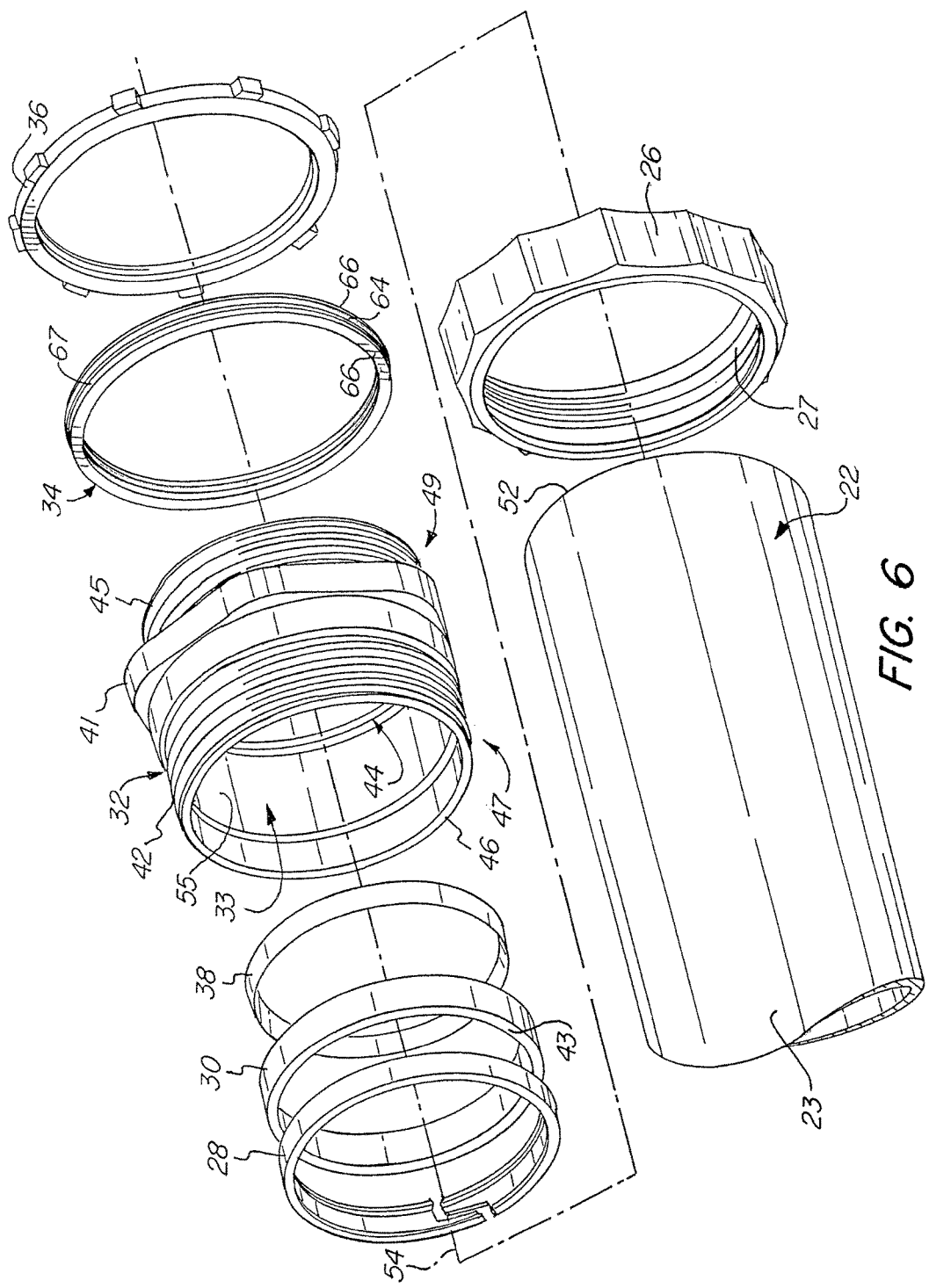
FIG. 6 is an exploded perspective view of the components of the raintight compression connector.
Figure 7:
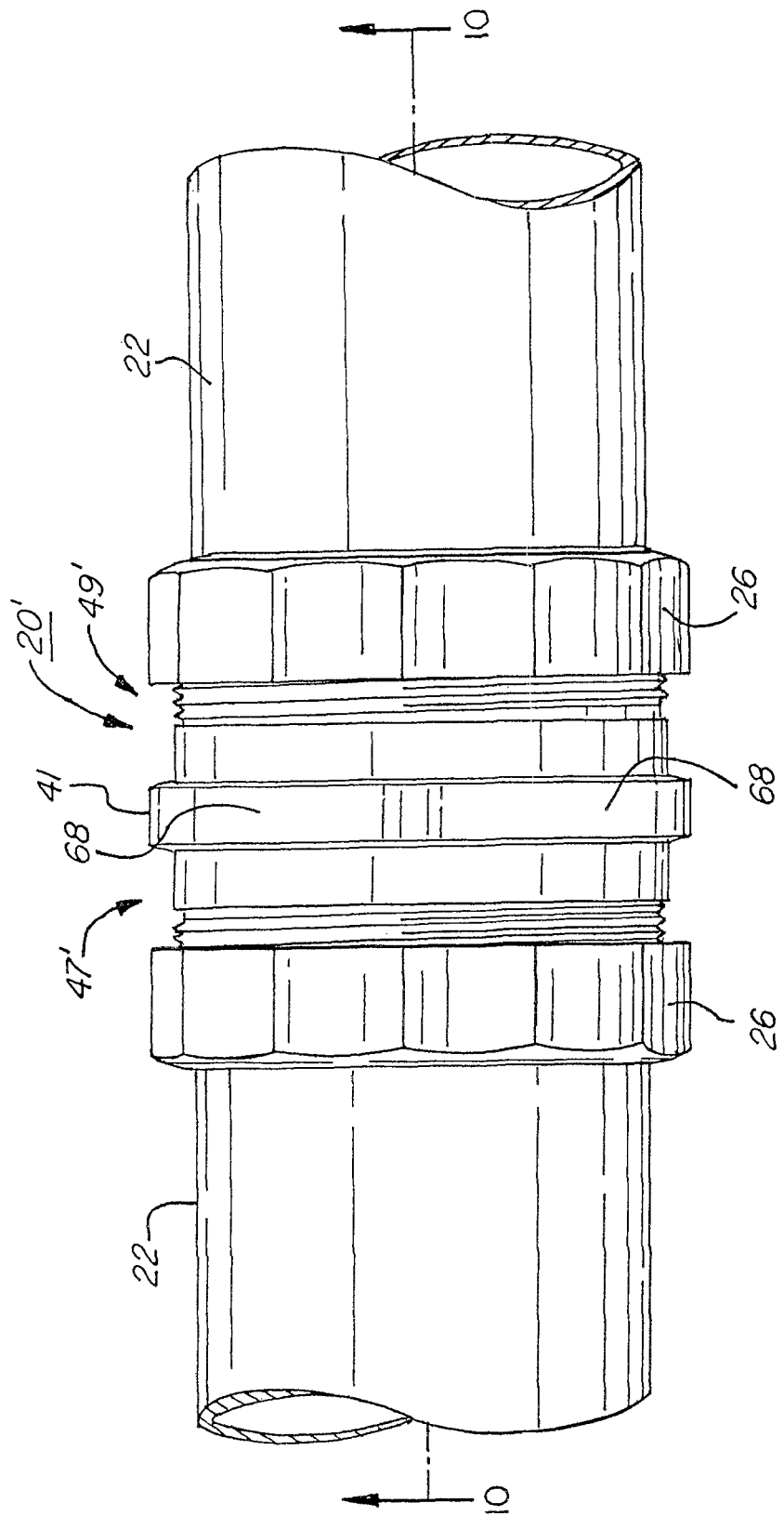
FIG. 7 is a side view of a raintight compression coupler according to an embodiment of the present invention, the coupler attached to two EMT's or RMC's.

As seen in FIG. 6, conduit 22 is thus inserted into an open end 46 of connector body 32 until it engages with the stop seal 38. Arrow 56 shown in FIG. 5 illustrates the direction of movement of the conduit so that it presses into and forms a seal with stop seal 38 when the conduit is pressed into the stop seal against shoulder 44. Shoulder 44 is sometimes referred to as a conduit stop. The stop seal is dimensioned to thereby form a slight annular bulge 50 as shown in phantom in FIG. 5, thereby forming a watertight seal with conduit terminating face 52. Because the stop seal is pliable in nature, it can accommodate slight diameter tolerance variations for EMT or RMC 22. It can also tolerate out-of-round conditions of the conduit. Furthermore, it especially can accommodate the terminating face 52 of the EMT or RMC being slightly skewed (not at a right angle) relative to the longitudinal axis 54 of the EMT or RMC (see FIG. 6). Such skewing of the terminating face 52 can occur in the field when EMT or RMC is cut by hand, for example. Thus, the stop seal forms a secondary seal to prevent water intrusion into bore 33 of conduit 22.

The stop seal may be molded from silicone or other pliable material, such as ethylene propylene diene monomer (EPDM) class synthetic rubber. Other types of elastomer synthetic rubber or other pliable material may of course be used. The stop seal can be secured to shoulder 44 of connector body 32, as well as to the inner peripheral wall 55 of the connector body by use of a cyanoacrylate type glue or a silicone-based adhesive. Other means, including the use of other types of adhesives, for securing the stop seal to the connector body would of course be apparent to those skilled in the art. It can also be seated against shoulder 44 and inner peripheral wall 55 without the use of an adhesive, such as by frictional contact.

Figure 3:
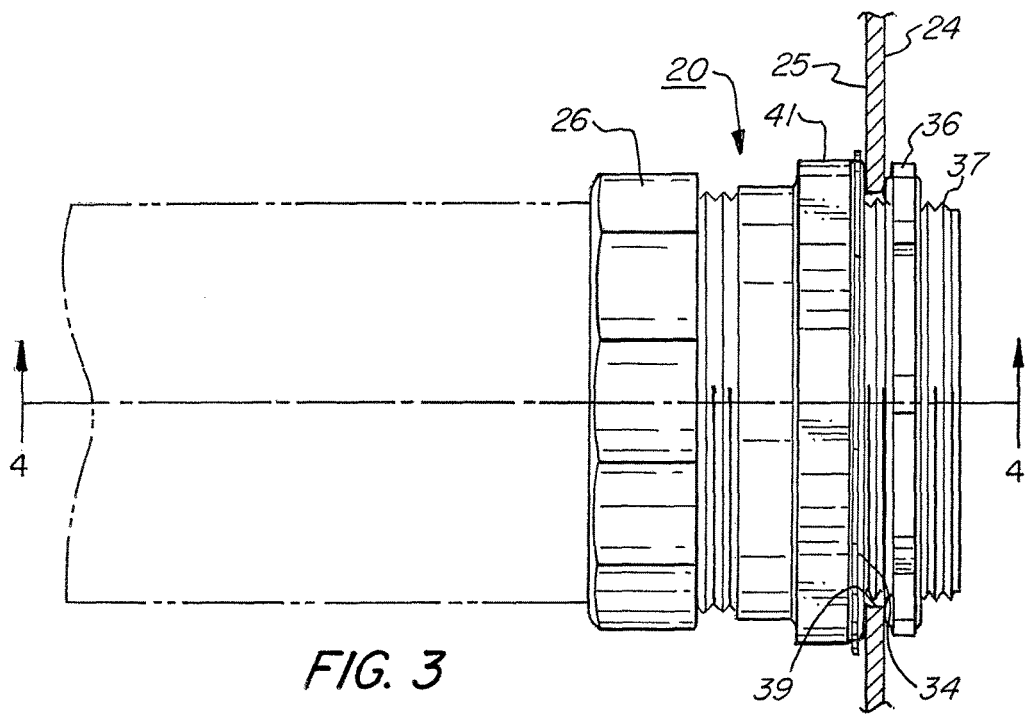
FIG. 3 is a side view of the raintight compression connector shown in FIG. 2.

FIGS. 3, 4, and 5 show how the raintight compression connector 20 is secured to an electrical enclosure 24 or other type of electrical housing or connecting body. Thus, knockout gasket 34 is compressed against the exterior of the electrical enclosure outer wall surface 35 by threaded engagement of locknut 36 with threads 37 formed in the second end portion 49 of connector body 32. This arrangement thereby pulls an outer flange 41 of connector body 32 against knockout gasket 34, which in turn forms a raintight seal against outer wall surface 35 of electrical enclosure 24. Outer flange 41 may have a multi-sided configuration with flat portions 68 to facilitate gripping during installation. Knockout gasket 34 typically is formed from a steel washer 64 having faces 67, with a pliable material 66 molded to at least a portion of both faces 67. The pliable material can be polyethylene, for example.

Although upper sealing ring 30 forms a primary seal to block the intrusion of water, it has been discovered that this primary seal may still allow some water entry beyond the seal region, which as discussed below is remedied by an improved sealing ring 30' according to the present invention. For large conduit trade sizes, such as 3.5 inch and 4 inch outer diameter (OD) conduit, there can be surface roughness and/or variation of conduit outer diameter (OD) (see FIG. 12) which can be accommodated by an improved upper sealing ring according to the present invention. The improved upper sealing ring 30' shown in FIGS. 11-17 has a profile that can accommodate such surface roughness and/or OD tolerance variations of the conduit so as to allow the overall fitting 20 to meet Underwriter Laboratories raintight test number UL514 RT or similar type tests.

Figure 11:
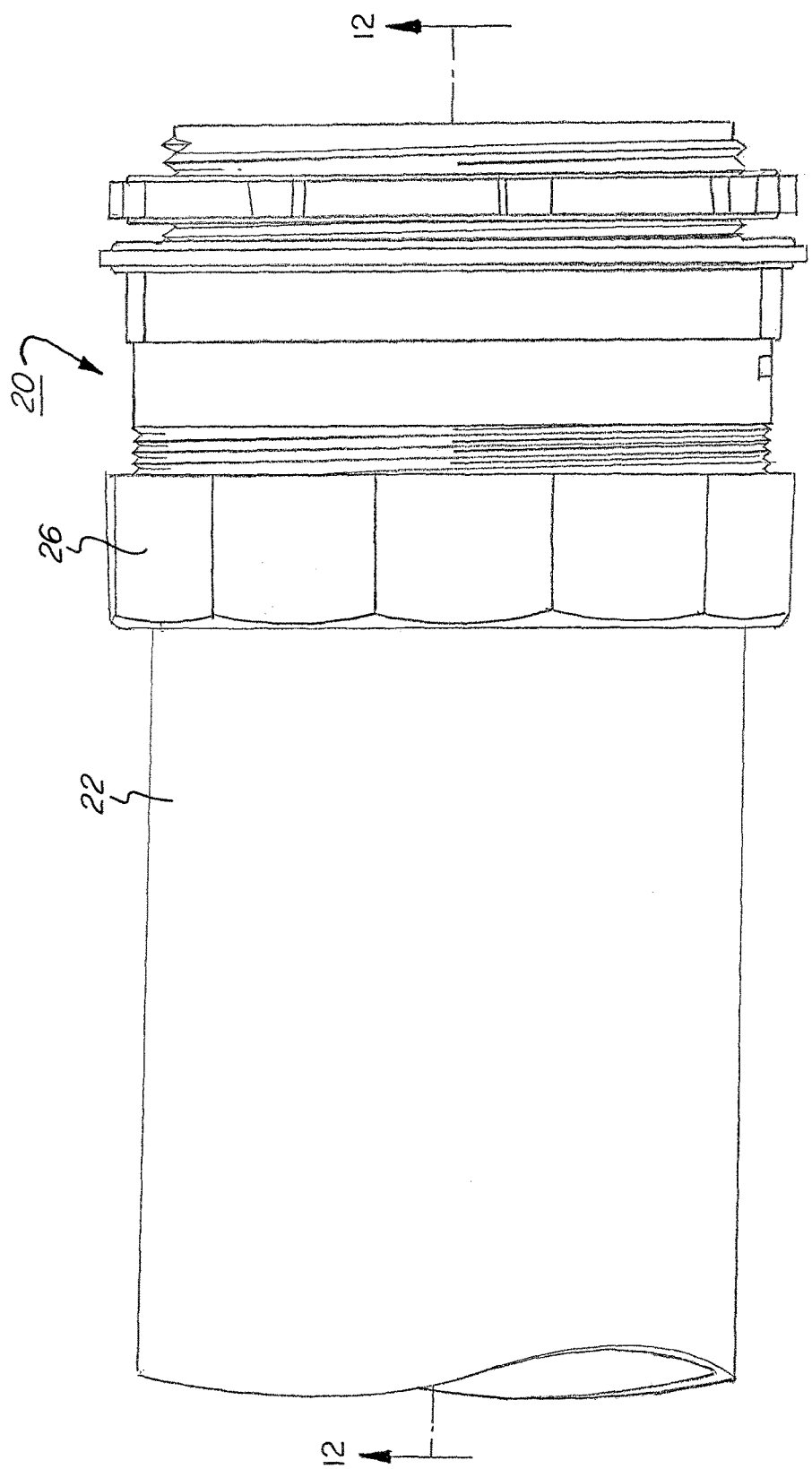
FIG. 11 is a side view of a raintight compression connector incorporating an improved upper sealing ring according to the present invention.
Figure 12:
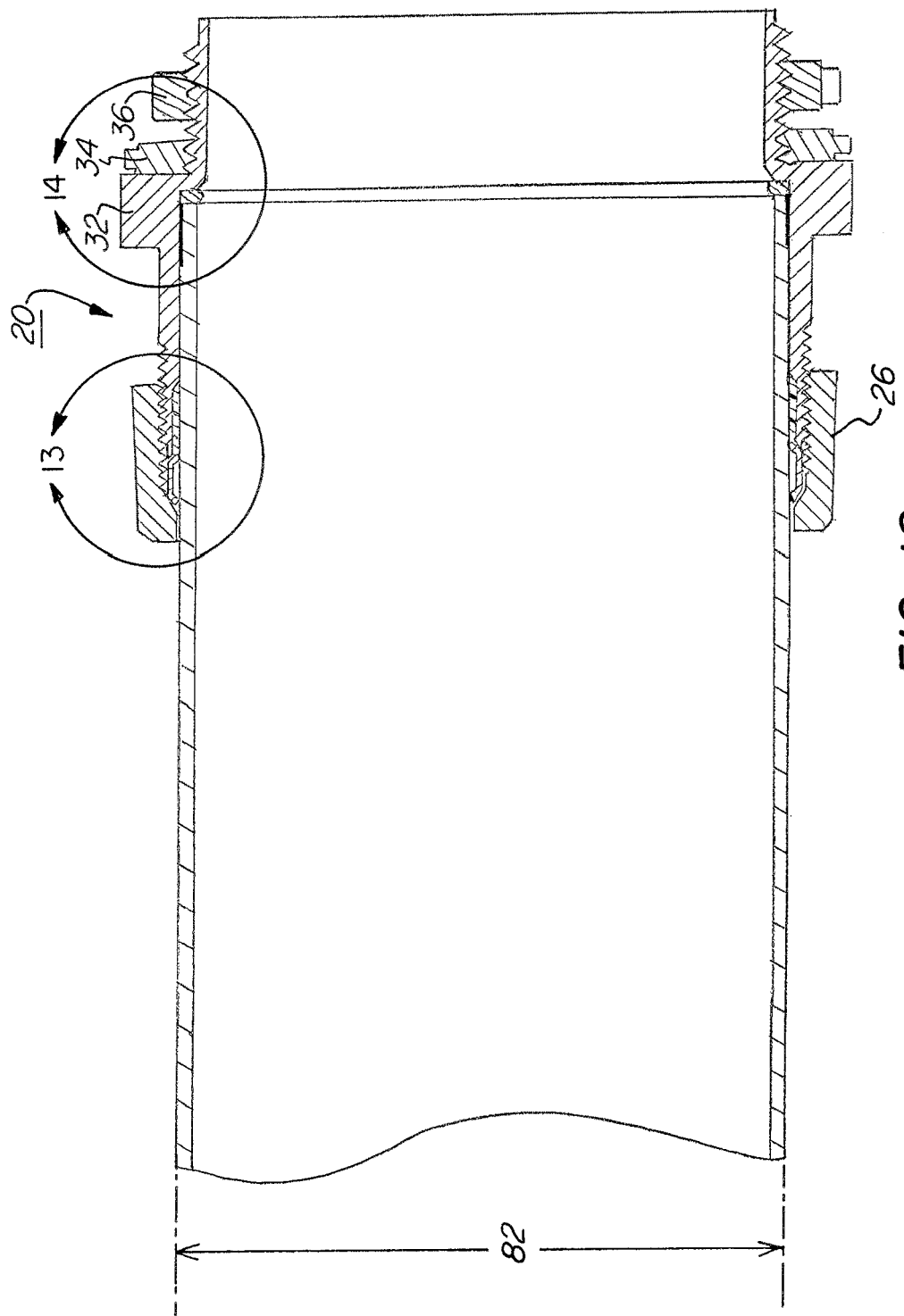
FIG. 12 is a cross-sectional view of the raintight compression connector taken along line 12-12 of FIG. 11.
Figure 13:
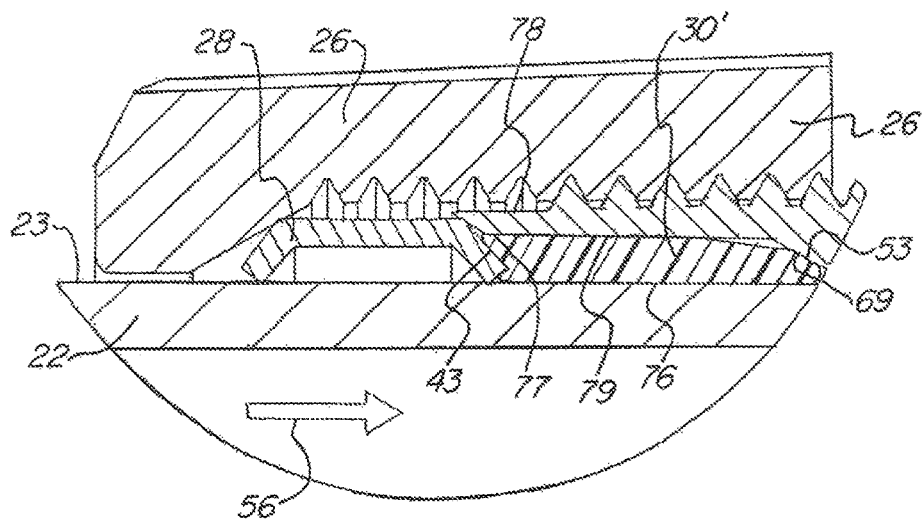
FIG. 13 is an enlarged cross-sectional view taken in the region of circle 13 shown in FIG. 12.
Figure 14:
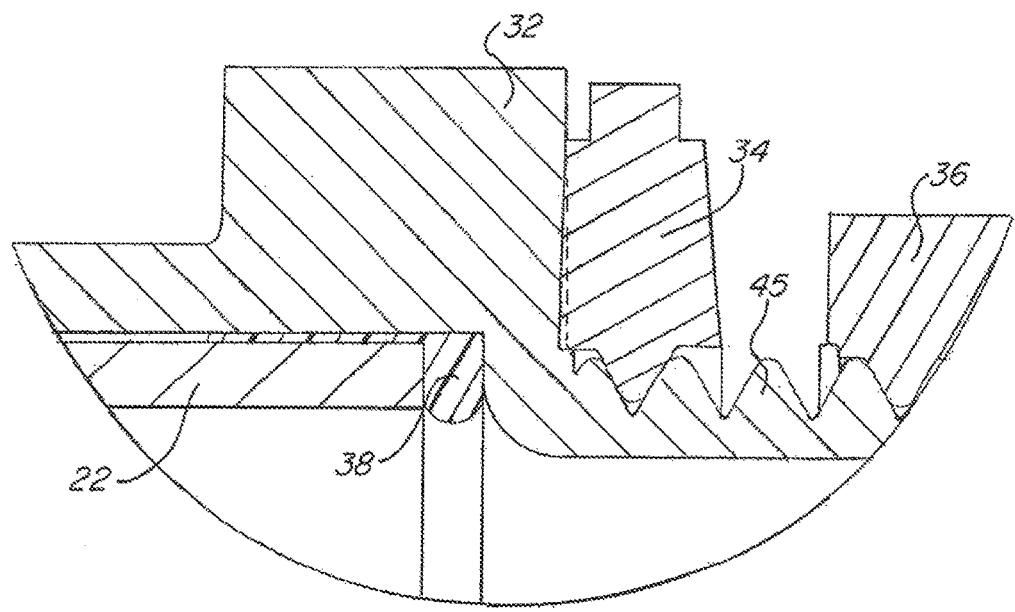
FIG. 14 is an enlarged cross-sectional view taken along circle 14 of FIG. 12 showing the conduit stop seal in its compressed configuration.
Figure 15:
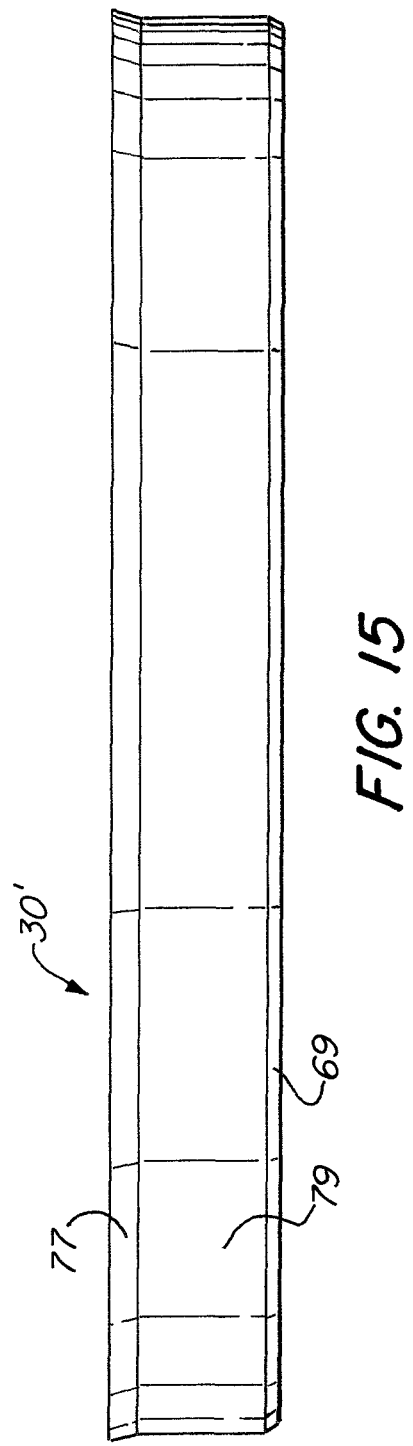
FIG. 15 is a side view of the upper sealing ring according to the present invention.

The improvement is that the upper sealing ring 30' shown in FIGS. 11-13 is configured to have a non-compressed cross-sectional shape as shown in FIGS. 15-17. It has been experimentally determined that this profile of upper sealing ring 30' facilitates the overall raintight operation of the raintight compression connector and raintight compression coupler, especially with regard to meeting Underwriter Laboratories test UL514B RT, and that this improved upper sealing ring is particularly advantageous for raintight compression connectors and raintight compression couplers in the 3.5 inch and 4 inch sizes (and other large trade sizes) associated with electrical metallic tubing (EMT) and the like.

As best seen in FIGS. 13, and 15-17, the improved sealing ring 30' has three regions 70, 71 and 72. The first region has a first sloping surface 69 that is configured to contact a recess shoulder 53 of connector body 32. The upper sealing ring second region 71 is formed between first region 70 and third region 72. The third region has a third sloping surface 77 as seen in FIGS. 15-17. This sloping surface is compressed so as to make contact with inner surface 78 of connector body 32 when the upper sealing ring 32 is urged in the direction of arrow 56 by gland ring 28 as the gland ring is forced in that direction by the threaded tightening of gland nut 26. The gland ring presses end surface 43 of the upper sealing ring. The end surface acts as a bearing surface that drives third sloping surface into the space between the inner surface 78 of connector body 32 and the outer surface 23 of conduit 22 (see FIG. 13). As seen in FIG. 13, outer surface 79 (second sloping surface) of second region 71 also makes contact with inner surface 78 of connector body 32. As such contact with the connector body occurs, the flat lower surface 76 of the upper sealing ring makes contact with outer surface 23 of conduit 22.

It has been experimentally discovered that due to the overall profile of upper sealing ring 30', a raintight seal can be achieved for large trade size conduit, including in the 3½ inch outer diameter (OD) and four inch OD trade sizes, which can have a significant tolerance variation in outer diameter and which can have significant roughness to the outer surface 23 of the conduit.

For a four inch trade size upper sealing ring shown in FIGS. 15-17, first sloping surface 69 has a slope of approximately 30 degrees (±0.5 degree) relative to surface 76 of the upper sealing ring, second sloping surface 79 has a slope of approximately 0.85 degree (±0.5 degree), and third sloping surface 77 has a slope of approximately 10 degrees (±0.5 degree). The relative length of first region 70, second region 71 and third region 72 to overall length 80 of upper sealing ring 30 is 6.5 percent, 70.2 percent and 23.3 percent.

Figure 19:
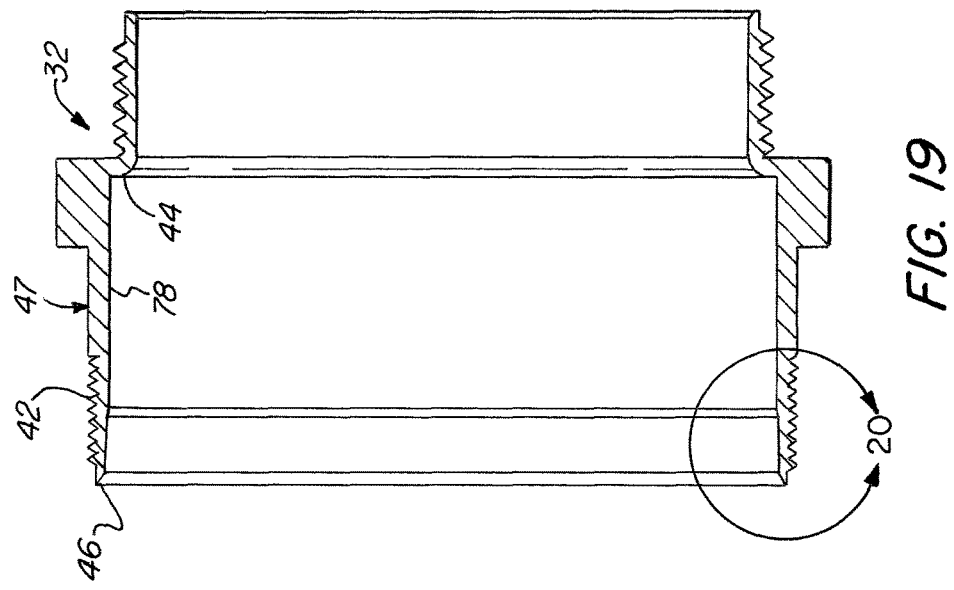
FIG. 19 is a cross-sectional view of the connector body taken along line 19-19 shown in FIG. 18.
Figure 18:
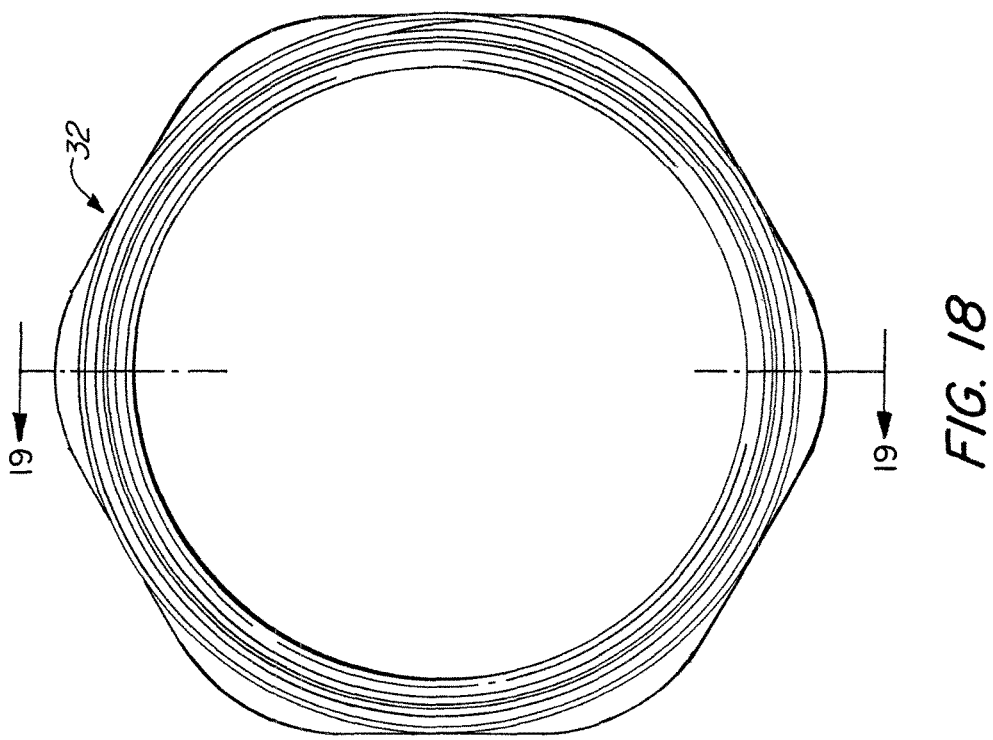
FIG. 18 is a top plan view of the connector body forming part of the raintight compression connector.
Figure 20:
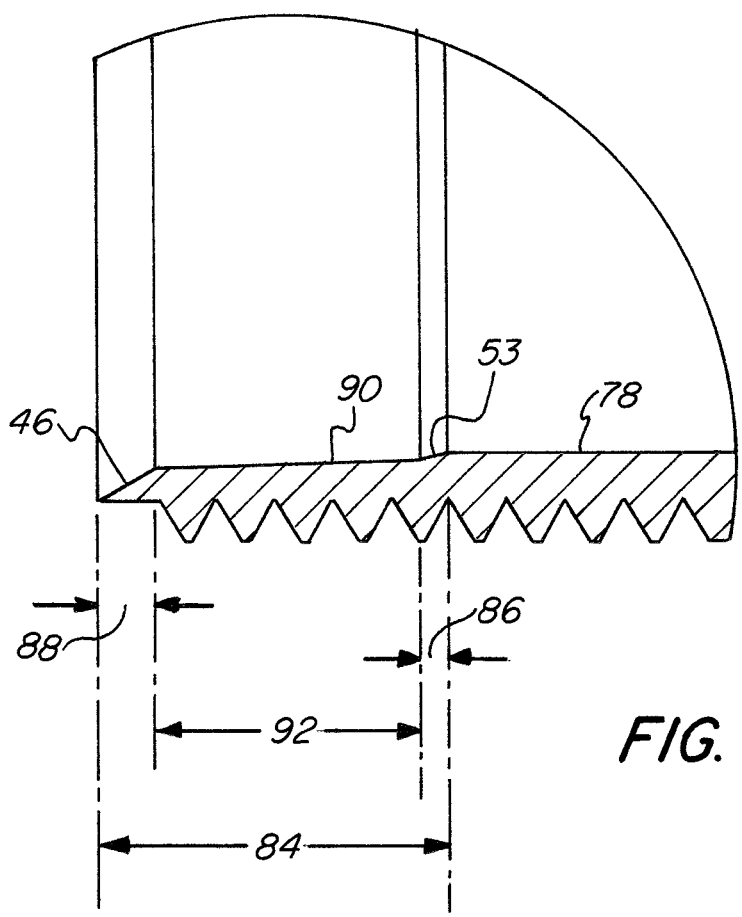
FIG. 20 is an enlarged view of a portion of the connector body taken around circle 20 shown in FIG. 19.

Slight variation in the above-described profile of upper sealing ring 30' is possible while achieving raintight sealing of the conduit by the compression connector, but the profile of the upper sealing ring as shown in FIGS. 15-17 is the preferred profile. These preferred dimensions of the upper sealing ring 30' are with respect to connector body dimensions shown in FIGS. 18-20. FIG. 18 shows connector body 32 for use with a four inch trade size conduit. FIG. 19 is a cross-sectional view taken along line 19-19 of FIG. 18, while FIG. 20 shows an enlarged view of recess shoulder 53 and first end 46 of first portion 47 of the connector body 32. It is there seen that the recess shoulder has a slope of 15 degrees (±0.5 degree) relative to longitudinal axis 54 (see FIG. 6) and first end 46 has a chamfered configuration with an angle of 30 degrees (±0.5 degrees) relative to axis 54.

The first portion 47 starting at recess shoulder 53 has an overall length designated by reference numeral 84. With respect to this overall length, the recess shoulder has a relative length 86 of 8 percent, first end 46 has a relative length 88 of 16 percent, and middle section 90 has a relative length 92 of 76 percent. Middle section 90 also has a slope (second sloping surface 79) of 2 degrees (±0.5 degree) relative to axis 54.

As seen in FIGS. 13, 19 and 20, threaded tightening of gland nut 26 onto connector body 32 urges gland ring 28 to move in the direction of arrow 56. As described above, gland nut 26 when threaded onto threads 42 compresses gland ring 28 which in turn bites into outer surface 23 of conduit 22 and also presses against end surface 43 (edge) of upper sealing ring 30' (see FIG. 17). This urging of the upper sealing ring forces first sloping surface 69 into contact with recess shoulder 53 formed in first end portion 47 of connector body 32 (in cutout region 51). This urging of the upper sealing ring against recess shoulder 53 thus causes the upper sealing ring first sloping surface 69 to press against inner surface 78 of first portion 47 and for lower surface 76 of the upper sealing ring to press against outer surface 23 of EMT or RMC 22. In addition, third sloping surface 77 also presses against inner surface 78 while a portion of second sloping surface 79 may similarly presses against inner surface 78. This is best seen in FIG. 13.

This arrangement of components allows the raintight compression connector to accommodate the allowed nominal variations in outer diameters of conduit 22, as well as variations in the outer surface conditions (roughness) of the conduit and out-of-round conditions of the conduit (that may result from clamping the conduit, dropping the conduit, etc.), while maintaining a sealed relationship between the raintight compression connector and the conduit.

Figure 8:
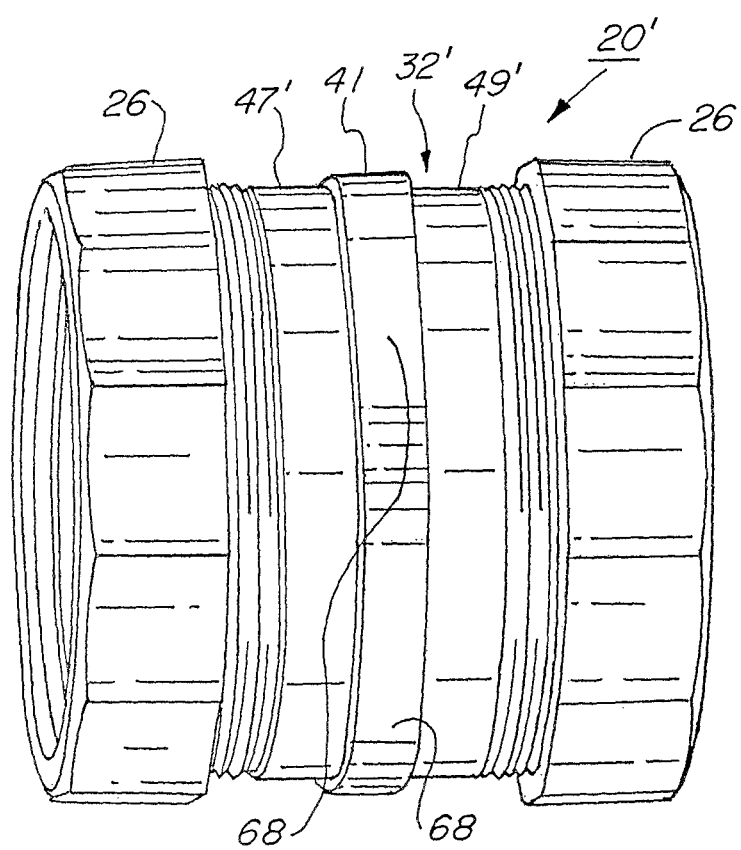
FIG. 8 is a perspective view of the raintight compression coupler shown in FIG. 7 without the EMTs or RMC's attached.
Figure 9:
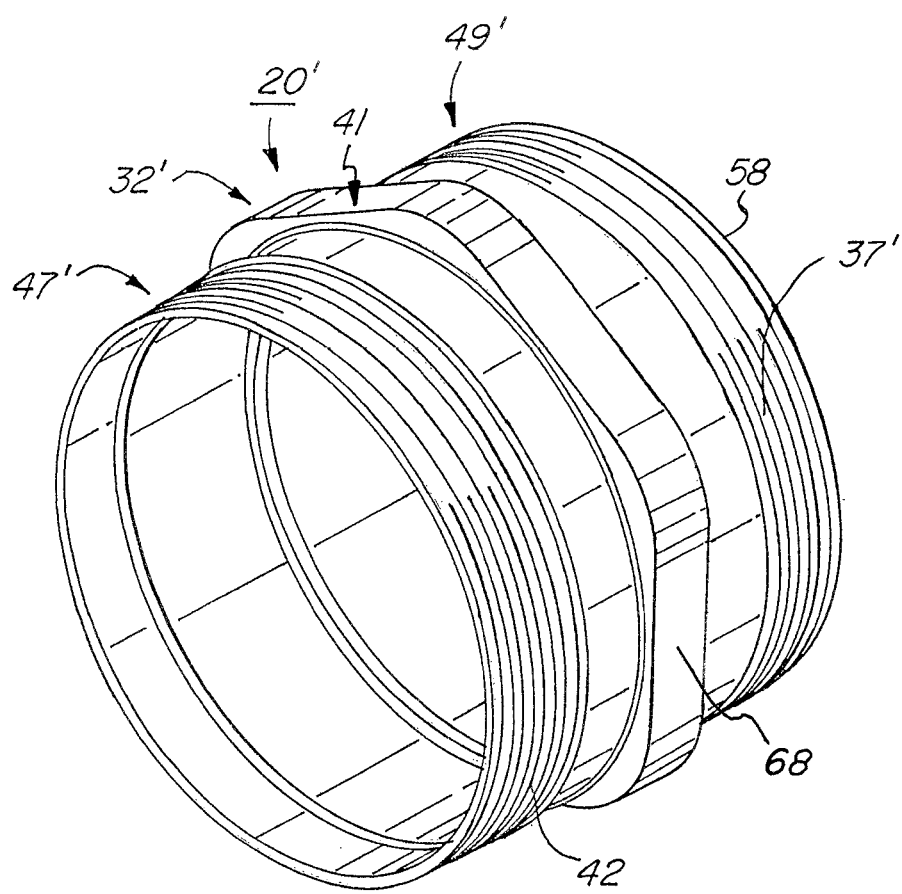
FIG. 9 is a perspective view of the raintight compression coupler without the gland nuts attached.
Figure 10:
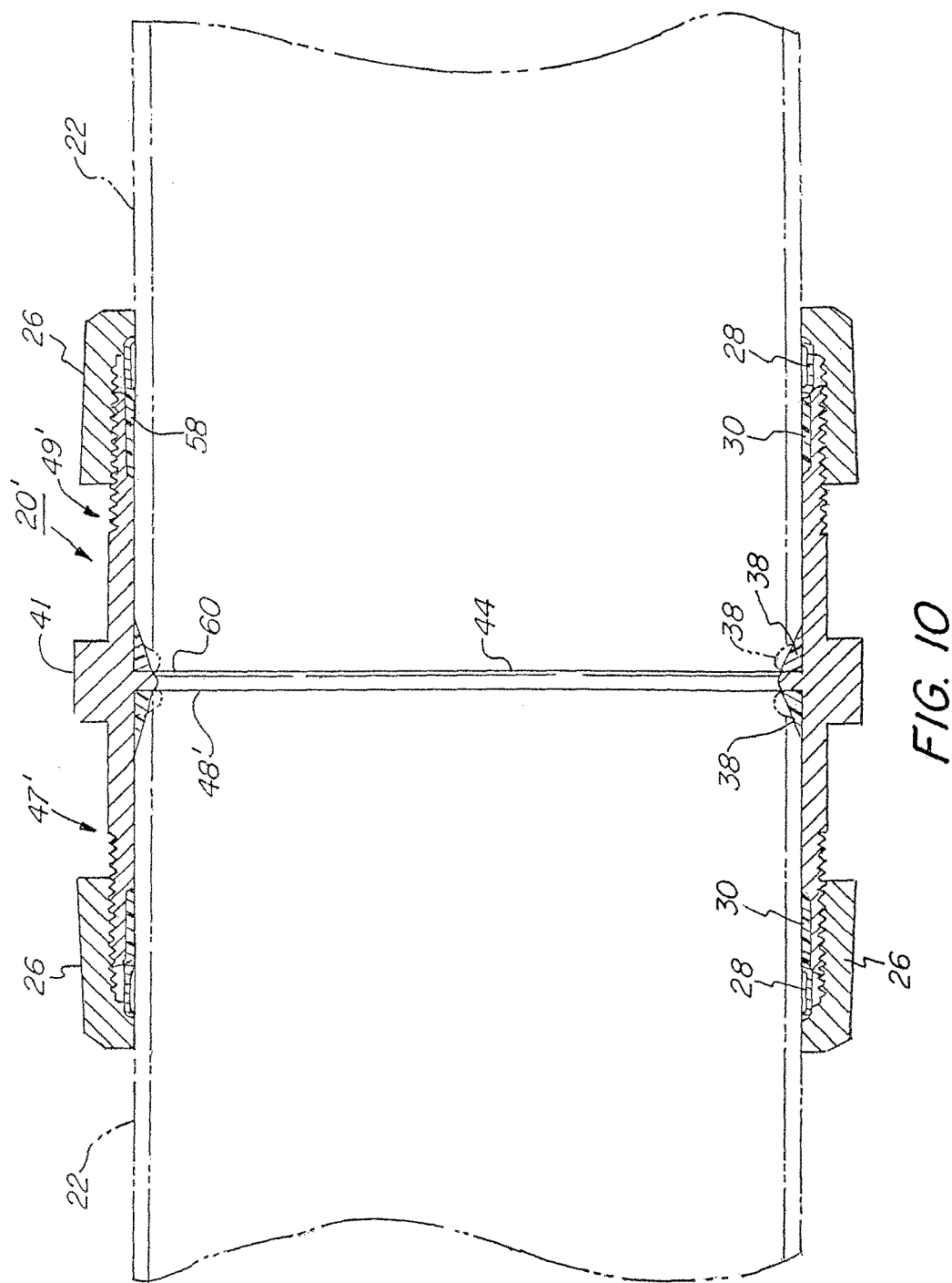
FIG. 10 is a cross-sectional view of the raintight compression coupler taken along line 10-10 of FIG. 7, showing the EMT's or RMC's and stop seals in dashed lines when the conduits are inserted into the coupler, the latter as deformed by the EMTs or RMC's so as to form a substantially raintight seal therewith.

FIGS. 7-10 show another embodiment of the present invention directed to a raintight compression coupler 20'. The coupler is for connection to two EMTs or RMC's 22. FIG. 8 shows that the coupler has a first portion 47' corresponding to first portion 47 of raintight compression connector 20. Second portion 49' is the mirror image of first portion 47'. Flange 41' is positioned at the junction of first portion 47' and second portion 49'. It has a multi-sided configuration with flat portions 68 to facilitate gripping during installation. As seen in FIG. 10, raintight compression coupler 20' has gland rings 28, upper sealing rings 30, and stop seals 38 corresponding to those components for raintight compression connector 20, with corresponding components for both first portion 47' and second portion 49'. The improvement to these upper sealing rings 30' is shown in FIGS. 12-17 as described above. Shoulder (conduit stop) 44 is at the second end 48' of first portion 47' and at second end 60 of second portion 49'. The stop seals for the first and second portion 47' and 49' are positioned against this shoulder and secured to connector body 32' typically by use of a cyanoacrylate type glue or silicone-based adhesive. Although one shoulder is shown, two separate shoulders with a space therebetween could be used. Second external threads 37' are formed in second portion 49' at first end 58 thereof.

Each conduit 22 is therefore secured to raintight compression coupler 20' in the same manner as conduit 22 is secured to raintight compression connector 22. For both connector 20 and coupler 20', a raintight securement of an EMT or RMC is achieved in a manner that accommodates tolerance variations in the outer diameter of the EMT or RMC, variations in outer surface conditions of the EMT or RMC, out-of-round conditions of the EMT and skewed terminating face conditions of the EMT or RMC.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A raintight compression connector comprising:
   a connector body having a first portion and a second portion and a bore extending through the first portion and the second portion, the first portion dimensioned for receipt of a conduit in said bore, the first portion having a first end and a second end;
   a gland nut having internal threads dimensioned for threaded engagement with first external threads formed in the first portion at the first end;
   a gland ring dimensioned for contact with the gland nut so as to secure the gland nut and the first portion of the connector body to the conduit when the conduit is inserted into the first portion;
   an upper sealing ring dimensioned for contact with the first portion of the connector body so as to make sealing contact with the conduit when the conduit is inserted into the first portion, said upper sealing ring having first, second and third regions, the second region formed between the first and third regions, the first region having a sloping surface dimensioned to contact a recess shoulder in the bore of the first portion of the connector body and the third region having a sloping surface dimensioned to contact an inner surface of the first portion of the connector body; and
   a stop seal positioned in the bore of first portion against a shoulder formed in the first portion at the second end thereof, the stop seal dimensioned to contact a terminating face of the conduit so as to pliably deform around the conduit terminating face so as to form a watertight seal between said conduit terminating face and the shoulder;
   wherein the connector body has an outer flange and wherein the second portion of the connector body is dimensioned for receipt of a knockout gasket, the second portion having second external threads dimensioned for receipt of a locknut for securing the knockout gasket positioned around a knockout hole in an electrical enclosure between said outer flange and the electrical enclosure, thereby forming a raintight seal therewith.

2. The raintight compression connector according to claim 1, wherein the slope of said sloping surface of the third region is approximately ten degrees relative to a lower surface of the upper sealing ring.

3. The raintight compression connector according to claim 2, wherein the slope of said sloping surface of the first region is approximately thirty degrees relative to a lower surface of the upper sealing ring.

4. The raintight compression connector according to claim 3, wherein the second region has a sloping surface and wherein the slope of the sloping surface of the second region is approximately two degrees relative to a lower surface of the upper sealing ring.

5. The raintight compression connector according to claim 1, wherein the upper sealing ring has an overall length and the third region of said upper sealing ring is approximately twenty-three percent of said overall length.

6. The raintight compression connector according to claim 5, wherein the first region of said upper sealing ring is approximately six and one-half percent of said overall length of the upper sealing ring.

7. The raintight compression connector according to claim 1, wherein the upper sealing ring has an uncompressed cross-sectional profile with a flat lower surface having an overall length, wherein the sloping surface of the first region is approximately 30 degrees relative to the lower surface of the upper sealing ring and wherein the first region is approximately 6.5 percent of said overall length, wherein the sloping surface of the second region is approximately 0.85 degree relative to the lower surface of the upper sealing ring, wherein the sloping surface of the third region is approximately 10 degrees relative to the lower surface of the upper sealing ring and wherein the third region is approximately 23.3 percent of said overall length, and wherein each sloping surface slopes in the same direction.

8. The raintight compression connector according to claim 1, wherein the upper sealing ring is manufactured from a thermoplastic material.

9. The raintight compression connector according to claim 8, wherein the thermoplastic material is selected from the group consisting of polyethylene and polypropylene.

10. A raintight compression coupler comprising:
a connector body having a first portion and a second portion and a bore extending through the first portion and the second portion, the first portion dimensioned for receipt of a first conduit in said bore, the first portion having a first end and a second end and the second portion dimensioned for receipt of a second conduit in said bore, the second portion having a first end and a second end;
a first gland nut having internal threads dimensioned for threaded engagement with first external threads formed in the first portion at its first end;
a first gland ring dimensioned for contact with the first gland nut so as to secure the first gland nut and the first portion of the connector body to the first conduit when the first conduit is inserted into the first portion;
a first upper sealing ring dimensioned for contact with the first portion of the connector body so as to make sealing contact with the first conduit when the first conduit is inserted into the first portion, said first upper sealing ring having a first, second and third regions, the second region formed between the first and third regions, the first region having a sloping surface dimensioned to contact a recess shoulder in the bore of the first portion of the connector body and the third region having a sloping surface dimensioned to contact an inner surface of the first portion of the connector body; and
a first stop seal positioned in the bore of the first portion against a shoulder formed at the second end of the first portion, the first stop seal dimensioned to contact a terminating face of the first conduit so as to pliably deform around the first conduit terminating face so as to form a watertight seal between said first conduit terminating face and the first shoulder;
a second gland nut having internal threads dimensioned for threaded engagement with second external threads formed in the second portion at its first end;
a second gland ring dimensioned for contact with the second gland nut so as to secure the second gland nut and the second portion of the connector body to the second conduit when the second conduit is inserted into the second portion;
a second upper sealing ring dimensioned for contact with the second portion of the connector body so as to make sealing contact with the second conduit when the second conduit is inserted into the second portion, said second upper sealing ring having first, second and third regions, the second region formed between the first and third regions, the first region having a sloping surface dimensioned to contact a recess shoulder in the bore of the first portion of the connector body and the third region having a sloping surface dimensioned to contact an inner surface of the second portion of the connector body; and
a second stop seal positioned in the bore of the second portion against a shoulder formed at the second end of the second portion, the second stop seal dimensioned to contact a terminating face of the second conduit so as to pliably deform around the second conduit terminating face so as to form a watertight seal between said second conduit terminating face and the shoulder.

11. The raintight compression coupler according to claim 10, wherein the slopes of said sloping surface of the third region of the first upper sealing ring and the sloping surface of the third region of the second upper sealing ring are approximately ten degrees relative to a lower surface of the first upper sealing ring and a lower surface of the second upper sealing ring respectively.

12. The raintight compression coupler according to claim 11, wherein the slopes of the sloping surface of the first region of the first upper sealing ring and the sloping surface of the first region of the second upper sealing ring are approximately thirty degrees relative to a lower surface of the first upper sealing ring and a lower surface of the second upper sealing ring respectively.

13. The raintight compression coupler according to claim 12, wherein the second region of the first upper sealing ring and the second region of the second upper sealing ring each has a sloping surface and wherein the slopes of the sloping surface of the second region of the first upper sealing ring and the sloping surface of the second region of the second upper sealing ring are approximately two degrees relative to a lower surface of the first upper sealing ring and a lower surface of the second upper sealing ring respectively.

14. The raintight compression coupler according to claim 10, wherein the first upper sealing ring and the second upper sealing ring each has an overall length and the third region of said first and second upper sealing rings are each approximately twenty-three percent of said overall length.

15. The raintight compression coupler according to claim 14, wherein the first region of said first upper sealing ring and said second upper sealing ring are each approximately six and one-half percent of said respective overall length of the first and second upper sealing rings.

16. The raintight compression coupler according to claim 10, wherein the first upper sealing ring and the second upper sealing ring each has an uncompressed cross-sectional profile with a flat lower surface having an overall length, wherein the sloping surface of the first region is approximately 30 degrees relative to the lower surface of the upper sealing ring and wherein the first region is approximately 6.5 percent of said overall length, wherein the sloping surface of the second region is approximately 0.85 degree relative to the lower surface of the upper sealing ring, wherein the sloping surface of the third region is approximately 10 degrees relative to the lower surface of the upper sealing ring and wherein the third region is approximately 23.3 percent of said overall length, and wherein each sloping surface slopes in the same direction.

17. The raintight compression coupler according to claim 10, wherein the first and second upper sealing rings are manufactured from a thermoplastic material.

18. The raintight compression coupler according to claim 17, wherein the thermoplastic material is selected from the group consisting of polyethylene and polypropylene.

\* \* \* \* \*